(12) United States Patent
Smith et al.

(10) Patent No.: US 9,256,765 B2
(45) Date of Patent: Feb. 9, 2016

(54) SYSTEM AND METHOD FOR IDENTIFYING SOFTWARE CHANGES

(75) Inventors: Christopher T. Smith, Sherwood, OR (US); David M. Bleckmann, Portland, OR (US)

(73) Assignee: KIP Sign P1 LP, New York, NY (US)

( * ) Notice: Subject to any disclaimer, the term of this patent is extended or adjusted under 35 U.S.C. 154(b) by 758 days.

(21) Appl. No.: 13/538,007

(22) Filed: Jun. 29, 2012

(65) Prior Publication Data

US 2014/0006796 A1 Jan. 2, 2014

(51) Int. Cl.
*G06F 21/64* (2013.01)
*G06F 21/00* (2013.01)

(52) U.S. Cl.
CPC .............. *G06F 21/645* (2013.01); *G06F 21/00* (2013.01)

(58) Field of Classification Search
CPC ......... G06F 21/00; G06F 21/10; G06F 21/12; G06F 21/50; G06F 21/52; G06F 21/55; G06F 21/552; G06F 21/56; G06F 21/562; G06F 21/564; G06F 21/565; G06F 21/566; G06F 21/60; G06F 21/64; G06F 21/645; G06F 2221/2115
See application file for complete search history.

(56) References Cited

U.S. PATENT DOCUMENTS

| | | | |
|---|---|---|---|
| 5,491,791 A * | 2/1996 | Glowny et al. .................. 714/37 |
| 5,919,257 A * | 7/1999 | Trostle .............................. 726/22 |
| 6,101,507 A * | 8/2000 | Cane ................... G06F 11/1451 |
| | | | 707/999.201 |
| 6,366,930 B1 * | 4/2002 | Parker et al. |
| 6,738,932 B1 * | 5/2004 | Price ........................... 714/38.11 |
| 6,738,970 B1 * | 5/2004 | Kruger et al. .................. 717/175 |
| 6,816,872 B1 * | 11/2004 | Squibb .............. G06F 17/30067 |
| 6,847,982 B2 | 1/2005 | Parker et al. |
| 7,236,968 B2 | 6/2007 | Wong et al. |
| 7,389,539 B1 * | 6/2008 | Kouznetsov ............ G06F 21/55 |
| | | | 713/188 |
| 7,454,463 B2 | 11/2008 | Raguseo et al. |
| 7,457,951 B1 * | 11/2008 | Proudler et al. .............. 713/164 |
| 7,591,103 B2 * | 9/2009 | Tremble et al. ................. 49/185 |
| 7,702,641 B2 * | 4/2010 | Holtz ................ G06F 17/30091 |
| | | | 707/999.101 |
| 7,739,738 B1 | 6/2010 | Sobel et al. |
| 7,765,592 B2 * | 7/2010 | Wang et al. ..................... 726/22 |
| 8,935,295 B2 * | 1/2015 | Malloy et al. ................. 707/802 |
| 2001/0037454 A1 * | 11/2001 | Botti ....................... G06F 21/64 |
| | | | 713/176 |
| 2002/0091644 A1 | 7/2002 | Wong et al. |
| 2003/0177394 A1 * | 9/2003 | Dozortsev ..................... 713/201 |
| 2004/0205340 A1 * | 10/2004 | Shimbo et al. ................ 713/165 |
| 2005/0038827 A1 * | 2/2005 | Hooks ........................... 707/200 |
| 2005/0132122 A1 * | 6/2005 | Rozas ........................... 711/100 |
| 2006/0095470 A1 * | 5/2006 | Cochran et al. ............. 707/104.1 |
| 2006/0288217 A1 * | 12/2006 | Jennings ..................... 713/176 |
| 2007/0143629 A1 * | 6/2007 | Hardjono et al. ............. 713/189 |
| 2007/0150957 A1 * | 6/2007 | Hartrell et al. ................. 726/24 |

(Continued)

*Primary Examiner* — Eric W Shepperd
(74) *Attorney, Agent, or Firm* — Baker & Hostetler LLP (57) ABSTRACT

An enterprise trust server (ETS) can include a user interface configured to initiate generation of a first file signature associated with a first file accessed from a file system associated with a computer system at a first time and generation of a second file signature associated with a second file accessed from the file system at a second time subsequent to the first time. The ETS also includes a file signature comparator configured to compare the first and second file signatures to determine a difference set of file signatures. The ETS can be configured to send a request comprising the difference set of file signatures to a trust repository and to receive a response that identifies a software product associated with the first and second files that changed between the first and second times based on the difference set of file signatures.

21 Claims, 3 Drawing Sheets

(56) References Cited

U.S. PATENT DOCUMENTS

| | | | |
|---|---|---|---|
| 2008/0010682 A1 | 1/2008 | Hamid | |
| 2008/0263669 A1* | 10/2008 | Alme | G06F 21/56 726/24 |
| 2008/0313029 A1* | 12/2008 | Evans | G06Q 30/02 705/14.53 |
| 2010/0100774 A1* | 4/2010 | Ding et al. | 714/45 |
| 2010/0218031 A1* | 8/2010 | Agarwal et al. | 714/2 |
| 2010/0228750 A1* | 9/2010 | Solin | 707/755 |
| 2010/0326736 A1 | 12/2010 | Etchegoyen | |
| 2011/0066719 A1 | 3/2011 | Miryanov et al. | |
| 2011/0093701 A1 | 4/2011 | Etchegoyen | |
| 2015/0052605 A1* | 2/2015 | Yu | 726/23 |

\* cited by examiner

SYSTEM AND METHOD FOR IDENTIFYING SOFTWARE CHANGES

TECHNICAL FIELD

This disclosure relates generally to network and computer systems, and specifically to a system and method for identifying software changes.

BACKGROUND

File systems on computers and computer systems can store a variety of different software files. The software files that are stored in the file systems can correspond to a number of different software products that are installed on the given computer or computer system. It is often necessary to access and identify the software files stored in the file systems, such as for maintenance and troubleshooting purposes. One such example can be to determine if a malicious computer virus or malware has been loaded onto the computer system. Many of the software files that are stored in a computer system are generated and/or utilized by the computer system in a manner that is transparent to the user, such as by the result of the operation of background processes of software products that run on the respective computer system. Such software files can often still be accessed from the file system by a user.

SUMMARY

One embodiment includes an enterprise trust server (ETS) programmed to execute machine readable instructions. The ETS includes a user interface configured to initiate generation of a first file signature associated with a first file accessed from a file system associated with a computer system at a first time and generation of a second file signature associated with a second file accessed from the file system at a second time subsequent to the first time. The ETS also includes a file signature comparator configured to compare the first and second file signatures to determine a difference set of file signatures. The ETS can be configured to send a request comprising the difference set of file signatures to a trust repository and to receive a response that identifies a software product associated with the first and second files that changed between the first and second times based on the difference set of file signatures.

Another embodiment includes a non-transitory computer-readable medium programmed for performing a method for identifying a change in software on a computer system. The method includes scanning at least one file system associated with the computer system to access at least one file in response to the software change identification request. The method also includes generating a at least one file signature corresponding to the respective at least one file and comparing the at least one file signature to a at least one baseline file signature to generate a difference set of file signatures, the at least one baseline file signature corresponding to a state of the at least one file at a previous time. The method also includes requesting identification of at least one software product associated with the at least one file that changed since the previous time based on the difference set of file signatures. The method further includes receiving results corresponding to a comparison of the difference set of file signatures with predetermined file signature data associated with a plurality of software products to determine at least one software product associated with the at least one file that changed since the previous time. The method further includes providing a software change report associated with the determination of the at least one software product that changed based on the results corresponding to the comparison of the difference set of file signatures with the predetermined file signature data.

Another embodiment includes a software change identification system. The system includes a plurality of enterprise trust servers that are each configured to initiate generation of a first at least one file signature associated with a first at least one file accessed from at least one file system associated with at least one computer system at a first time, and generation of a second at least one file signature associated with a second at least one file accessed from the at least one file system at a second time subsequent to the first time. The plurality of enterprise trust servers can each be further configured to compare the respective first and second pluralities of file signatures to determine a difference set of file signatures. The system also includes a trust repository communicatively coupled to the plurality of enterprise trust servers via a network and configured to receive the difference set of file signatures from each of the plurality of enterprise trust servers and to compare the difference set of file signatures with predetermined file signature data associated with a plurality of software products to determine at least one software product associated with the first and second pluralities of files that changed between the first and second times.

DETAILED DESCRIPTION

This disclosure relates to a system and method for identifying software changes. The system can include an enterprise trust server (ETS) that is coupled to one or more computer systems, such as via a network. The ETS can initiate a scan of at least one or more files, such as may be stored in a file system associated with the computer system(s). The scan can be performed via an ETS client, such as a software module that is installed on the computer system. The scan, for example, can be initiated in response to a software change identification request, such as initiated at the ETS. The ETS client can then generate at least one file signature corresponding to the respective at least one file. The at least one file signature can each include characteristics associated with the at least one file, such as file name, path, attributes, permissions, and content. As an example, the ETS can be programmed to generate the file signature to include cryptographic hash data corresponding to the file content.

The ETS can be configured to compare the at least one file signature with a baseline set of file signatures that are saved at the ETS and that are associated with at least one file. For example, the baseline set of file signatures can correspond to at least one file that is scanned from the at least one computer system by the ETS client at a previous time. The ETS can then generate a difference set of file signatures based on the comparison of the at least one file signature with the baseline set of file signatures. As an example, the difference set of file signatures can correspond to at least one of one or more file signatures in the at least one file signature that is not in the baseline set of file signatures, one or more file signatures in the baseline set of file signatures that is not in the at least one file signature, and one or more file signatures in each of the at least one file signature and the baseline set of file signatures having at least one common characteristic and at least one difference in file content. Thus, the difference set of file signatures can correspond to at least one of newly added files, deleted files, and modified files, respectively. In addition, the difference set of file signatures can include zero file signatures, such that the difference set of file signatures corresponds to no change between the set of file signatures and the baseline set of file signatures (i.e., no files added, removed, or modified).

The enterprise trust server can be configured to transmit the difference set of file signatures to a trust repository via a network, such as the Internet, an intranet, or a combination thereof. The trust repository can be programmed to implement a matching algorithm to compare the difference set of file signatures with predetermined software file signature data. The trust repository can thus identify at least one software product that changed since a previous time when the baseline set of file signatures was created based on the results of the comparison. The comparison could yield results that indicate probabilities of more than one software product that changed, such as based on the matching algorithm results. The results can be returned to the ETS. The ETS can be programmed to generate a user-viewable report based on the results, such as including scores or other indications of a likelihood that the file belongs to different possible products that changed.

Figure 1:
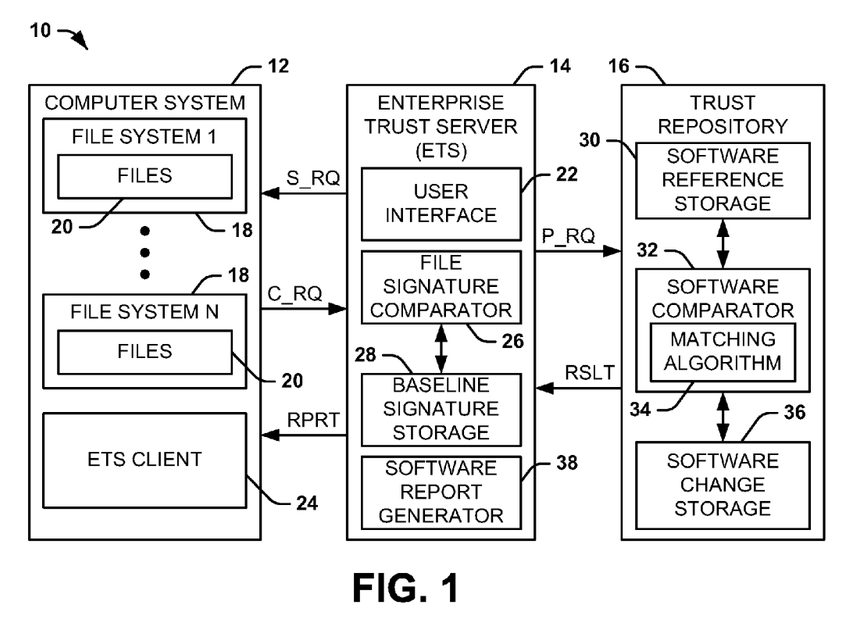
FIG. 1 illustrates an example of a software change identification system in accordance with an aspect of the invention.

FIG. 1 illustrates an example of a software identification system 10. As an example, the software identification system 10 can be distributed in a network system, such as a local-area network (LAN) and/or a wide-area network (WAN), or could be configured in a virtual network on a single computer system. In the example of FIG. 1, the software identification system 10 includes a computer system 12, an enterprise trust server (ETS) 14, and a trust repository 16. As an example, the computer system 12 can be configured as a single computer, such as a personal computer, work station, or an enterprise server, or could be implemented to include a plurality of computers, such as configured in a network.

In the example of FIG. 1, the computer system 12 includes a plurality N of file systems 18, where N is a positive integer, that each respectively include one or more files 20. As described herein, the term "file system" is intended to refer to any of a variety of computer storage systems containing one or more files. For example, the file systems 18 in the example of FIG. 1 can include hard disks, solid-state drives and devices, flash devices, floppy disks, CD/DVD media, a variety of read only memory (ROM) chips and/or embedded systems, such as can be configured to store basic input/output system (BIOS)/Operating System data, and/or any of a variety of other types of similar storage media. As another example, the file systems 18 can include peripheral storage devices, as well as storage devices configured internally with respect to the computer system 12. As described herein, the term "file" is intended to refer to a sequence of binary data or bytes stored in the file systems 18. The files 20 may have an associated name and path that identifies where it is stored in the respective file system 18. Each file can also include metadata that describes the data stored therein.

The ETS 14 is communicatively coupled to the computer system 12, such as via a network (e.g., a LAN, a WAN, and/or the Internet). The ETS 14 can be configured to communicate with the computer system 12 to act as a liaison between the computer system 12 and the trust repository 16 to facilitate a determination of one or more software products with which the files 20 have changed, as described in greater detail herein. As described herein, a "change" in a given software product is defined as a change to the files 20 associated with the given software product, including files 20 that have been deleted, added, or modified. In the example of FIG. 1, the ETS 14 includes a user interface 22. As an example, the user interface 22 can be accessible by a user at the ETS 14 and/or can be accessible by a user at the computer system 12 via the associated network. For example, the user interface 22 can correspond to a webpage or mobile device application, and can be accessible via a secure, authenticated network communication by any user with network access to the ETS 14. The ETS 14 can initiate a software change identification request, demonstrated as S_RQ, which is provided to the computer system 12. As an example, the software-identification request S_RQ can be provided by a user input via the user interface 22, or can be performed periodically and/or automatically by a program executing on a processor of the computer system 12 or the ETS 14. For example, the software change identification request S_RQ can be provided in response to downloading and/or uploading data to and/or from the computer system 12. While the software change identification request S_RQ is demonstrated as originating from the ETS 14, the request to the computer system 12 can be provided from a different system or process that is different from or outside of the ETS 14, such as the computer system 12 or a different system altogether. As disclosed herein, such request may be automatically generated or be responsive to a user input.

The software change identification request S_RQ can delineate one or more of the files 20 that are stored in one or more of the file systems 18 for a determination of identification of corresponding software products that changed. The delineation of the files 20 for which identification is requested can be based on any combination of groupings of the files 20 in the file system(s) 18, and may not require any sort of cohesiveness associated with the files 20. For example, the files 20 for which identification is requested can be selected arbitrarily by a user, by the ETS 14, or by the computer system 12, and need not be stored in the same file system 18 or associated with a given one process (e.g., a given sub-directory or query result). As another example, a user can select files 20 associated with a known software product via the user interface 22 for a determination of whether the software product has changed. Accordingly, any one or more files 20 can be selected from any one or more of the file systems 18 for a determination of a change in the software change identification request S_RQ.

In the example of FIG. 1, the computer system 12 includes an ETS client 24 that can be responsive to the software change identification request S_RQ to perform a scan of the computer system 12 to access the delineated files 20 from the respective file systems 18. The scan of the files 20 or the associated file system(s) 18 can be operative to generate metadata for each of such files 20 delineated in the request S_RQ. The ETS client 24 can thus generate a file signature for each of files 20 that are delineated in the software change identification request S_RQ as a result of the scan. While it is demonstrated in the example of FIG. 1 that the ETS client 24 is resident on the computer system 12, it is to be understood that the ETS client 24 could instead reside elsewhere, such as on a remote device that is coupled to the network or on the ETS 14.

Figure 2:
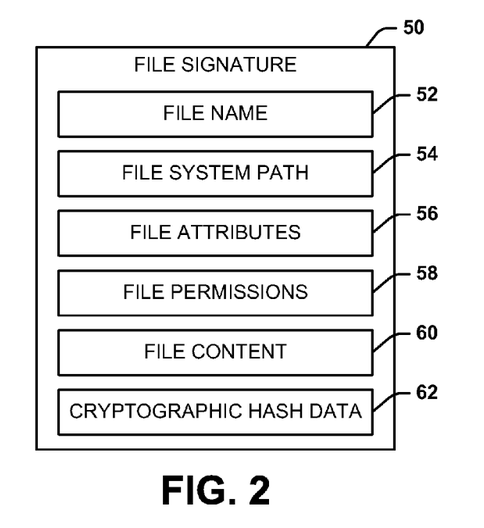
FIG. 2 illustrates an example of a file signature in accordance with an aspect of the invention.

FIG. 2 illustrates an example of a file signature 50 that can be generated by the ETS client 24 of FIG. 1. The file signature 50 can be constructed to characterize the file or files specified in the request S_RQ. In the example of FIG. 2, the file signature 50 can include a file name 52, a file system path 54, file attributes 56, file permissions 58, file content 60, and cryptographic hash data 62. For example, the file name 52 can include the text string that identifies the file 20 to a user, and can include a file extension. The file system path 54 can correspond to a logical location where the file 20 is stored in the corresponding file system 18, such as including directory and sub-directory information. The file attributes 56 can correspond to properties associated with the file 20, such as file size, modification times, and other general information regarding the file 20. File permissions 58 can correspond to security information associated with the file 20, such as including status as being read-only or being non-editable. The file content 60 can include at least a portion of the binary data of the file 20. The cryptographic hash data 62 can correspond to the cryptographic hash of at least a portion of the binary of file 20 represented as a cryptographic hash code.

As an example, the ETS client 24 can include or be programmed to employ a cryptographic hash function that is configured to generate the cryptographic hash data 62 based on at least a portion of the binary data of file 20. For instance the cryptographic hash function can encode an arbitrarily sized portion of binary data of the file into a fixed-size bit string, namely a cryptographic hash value corresponding to the cryptographic has data for such file. For example, the ETS client 24 can be configured to implement any of a variety of non-reversible data encoding algorithms to generate the cryptographic hash data 62 in a manner that substantially uniquely identifies each respect file 20 that is specified in the request S_RQ. As used herein, the term "substantially" is intended to indicate that while the function or results of the term being modified are a desired result that some variation can result. In this context, for example, the term "substantially uniquely" demonstrates that the resulting signatures usually are unique although it is statistically possible that the cryptographic hash for two files with different binary data could be the same. Some examples of cryptographic hash functions that can be utilized include MD5, SHA-1, and SHA-256 to name a few. The cryptographic hash data 62 of the given file 20 can thus include encoded information (e.g., a cryptographic hash value) that can be indicative of one or more software products with which the given file 20 is associated.

It is to be understood that the file signature 50 is not intended to be limited to the example of FIG. 2. For example, while the file signature 50 includes the file name 52, the file system path 54, the file attributes 56, the file permissions 58, the file content 60, and the cryptographic hash data 62, it is to be understood that the file signature 50 can include less information, additional information, or other forms of information associated with the respective file 20 that is not demonstrated in the example of FIG. 2. Therefore, the file signature 50 can be configured in a variety of different ways.

Referring back to the example of FIG. 1, upon generating file signatures for each of the files 20 delineated in the software-identification request S_RQ via the ETS client 24, the ETS client 24 can provide the file signatures to the ETS 14 as a client request C_RQ. As an example, the client request C_RQ can be constructed as a well-formed request (e.g., an XML document). The ETS 14 includes a file signature comparator 26 configured to compare the file signatures in the client request C_RQ with a baseline set of file signatures that are stored in a baseline signature storage 28 in the ETS 14. As an example, the baseline set of file signatures can correspond to a set of file signatures that were generated by the ETS client 24 for a set of files 20 that were scanned at a previous time. The baseline set of file signatures can correspond to all files 20 in the file system 18 scanned at the previous time, such that the software-identification request S_RQ can be associated with a scan of all files 20 in the file system 18 to determine all software products on the computer system 12 that changed. As another example, the baseline signature storage 28 can include a plurality of baseline sets of file signatures corresponding to the computer system 12, such as organized by software product, file system 18, or by previous software-identification request S_RQ. Therefore, the file signature comparator 26 can compare the file signatures with a corresponding set of baseline signatures.

In response to the comparison, the file signature comparator 26 can be configured to generate a difference set of file signatures that corresponds to a difference between the file signatures and the baseline set of file signatures. For example, the difference set of file signatures can correspond to at least one of one or more file signatures in the generated file signatures that is not in the baseline set of file signatures, one or more file signatures in the baseline set of file signatures that is not in the generated file signatures, and one or more file signatures in each of the generated file signatures and the baseline set of file signatures that have at least one common characteristic and at least one difference in file content. Thus, the difference set of file signatures can correspond to at least one of newly added files, deleted files, and modified files, respectively. Such a difference set of file signatures thus corresponds to a change in one or more of the files 20 associated with one or more software products that occurred since the time of creation of the baseline set of file signatures. In addition, the difference set of file signatures can include zero file signatures, such that the difference set of file signatures corresponds to no change between the set of file signatures and the baseline set of file signatures (i.e., no files added, removed, or modified).

As described previously, the difference set of file signatures can correspond to file signatures that have changed (e.g., added, removed, and/or modified) between the time that the files 20 were scanned by the ETS 14 and a previous time when the baseline set of file signatures were created. Therefore, the difference set of file signatures corresponds to changes in the files 20 between two separate times. Therefore, upon generating the difference set of file signatures, the ETS 14 can be configured to save the file signatures of the recently scanned files 20 in the baseline signature storage 28 as the baseline set of file signatures. For example, the new baseline set of signatures corresponding to the recently scanned files 20 can overwrite the previous baseline set of file signatures, or can be stored separately with a new timestamp. The new baseline set of file signatures can thus correspond to the baseline set of file signatures with which file signatures associated with files 20 that are scanned by the ETS client 24 at a later time can be compared, such as in response to a subsequent software change identification request S_RQ. Accordingly, the ETS 14 can be configured to continuously compare files signatures associated with presently scanned files 20 with a most recently generated baseline set of file signatures corresponding to file signatures of files 20 that were scanned at a previous time.

The ETS 14 can also be configured to package the difference set of file signatures as a product identification (ID) request P_RQ that is provided to the trust repository 16. As an example, the trust repository 16 can be coupled to the ETS 14 via a network, such as a WAN or LAN. For example, the trust repository 16 can correspond to a Global Trust Repository (GTR) that is coupled to the Internet, and thus accessible from a plurality of enterprise trust servers, including the ETS 14, via the Internet. The difference set of file signatures in the product ID request P_RQ transmitted to the trust repository 16 can be provided as separate requests, such as one request to identify file signatures that were added and one request to identify file signatures that were removed, based on the comparison by the file signature comparator 26. As another example, the difference set of file signatures in the product ID request P_RQ can be provided to the trust repository 16 as a single request. The single request can include data that is indicative of whether the difference set of file signatures corresponds to added, removed, and/or modified file signatures, such as to determine a cause of the change to the software product(s), as described in greater detail herein. In addition, the product ID request P_RQ can include data that specifies a hash algorithm utilized to generate the respective file signatures, settings and parameters that are to be included in a response, and each file signature that is included in the difference set of file signatures. For instance, the settings to be returned in the associated response can specify whether the results are to include matches, deviations, passed tests, failed tests, errors and related values. The instructions to the trust repository 16 can also specify resources that are to perform the identification process.

In the example of FIG. 1, the trust repository 16 includes a software reference storage 30 that is configured, for example, as a database to store predetermined software file signature data corresponding to predetermined software products. For example, the software reference storage 30 can include the characteristics associated file signatures of the predetermined software products, as well as predetermined cryptographic hash data associated with the file signatures, such that the difference set of file signatures in the product ID request P_RQ that are provided to the trust repository 16 can be compared with the predetermined software file signature data for identification of one or more software products with which the difference set of file signatures in the product ID request P_RQ are associated. Therefore, the trust repository 16 can determine which software products installed on the computer system 12 have changed based on the difference set of file signatures in the product ID request P_RQ.

As described herein, the term "software product" can refer to a specific commercial application software or software bundle. A software product can also refer to operating system software, to customized version of commercially available application software, or to completely custom software applications. Furthermore, a software product could also refer to a software upgrade or patch meant to be applied to one of the proceeding examples and can represent only a subset of files that comprise a complete working product. A given software product can include details regarding the manufacturer, the specific commercial software product name, as well as the specific version and/or release date. As one example, the software reference storage 30 can store, among many other software products, reference data for each separate releases (e.g., versions) of every product associated with Microsoft® Office (e.g., including every release of Word, Access, Excel, Outlook, etc.). Therefore, as an example, a single file signature may be associated with several different products stored in the software reference storage 30. For instance, two different releases of a given commercial software product, which can be stored separately in the software reference storage 30, can contain certain files that are common to multiple separate releases. In such a case, the trust repository 16 can be configured to identify all of the version/releases associated with the given software product; however, the trust repository 16 can be programmed to remove duplicates from the software reference storage 30 to conserve storage space.

As a further example, the trust repository 16 being configured as the GTR can be populated with billions of file signatures that can be associated with millions software products. The trust repository 16 can include automated and manual harvesting methods that monitor websites and software download portals for major commercial software vendors and download new software products when they are released. The downloaded software products can be deconstructed and all contained files can be parsed to generate corresponding file signatures. Each file signature can include cryptographic hash values representing the file content. The created predetermined file signatures can be packaged together with information on the specific software product with which they are associated and can be stored as the predetermined software file signature data, including the predetermined cryptographic hash data, in the software reference storage 30. Additionally, the trust repository 16 can be configured to, in response to being unable to identify a given software product based on a file signature (e.g., the cryptographic hash data) provided in the difference set of file signatures in the product ID request P_RQ, store the file signature in the software reference storage 30, such as for future identification based on subsequent website harvesting or for matching with other similar file signatures for determining file associations.

In the example of FIG. 1, the trust repository 16 also includes a software comparator 32 that is programmed to receive the difference set of file signatures in the product ID request P_RQ and to implement a matching algorithm 34 on the difference set of file signatures in the product ID request P_RQ for identification of the software product(s) that are associated with the difference set of file signatures in the product ID request P_RQ. As an example, the matching algorithm 34 can be configured to compare elements of the cryptographic hash data with elements of the predetermined cryptographic hash data of the predetermined software file signature data stored in the software reference storage 30 to determine a matching score of a given file signature relative to a given set of software products. For example, the matching score can be based on a score of elements of the cryptographic hash data of one or more file signatures that are differently weighted for matches and non-matches of associated elements in the predetermined cryptographic hash data of the software products stored in the software reference storage 30. The matching algorithm 34 can thus generate a set of matching scores for the one or more given file signatures that each represent a separate likelihood that given software products correspond to the software products with which the difference set of file signatures in the product ID request P_RQ is associated. The software comparator 32 can implement a threshold, such as to ignore matching scores that fall below a given threshold. Therefore, the software comparator 32 can discard matching scores that represent very unlikely possibilities of the difference set of file signatures in the product ID request P_RQ being associated with a respective software product. Thus, the software comparator 32 can be configured to narrow the evaluation to only relevant results.

The trust repository 16 also includes a software change storage 36. The software change storage 36 can be configured to store software change patterns and to implement pattern recognition algorithms associated with known changes in software products with respect to files therein. The software change storage 36 can thus be configured to correlate the changes in the software product(s) to a specific type of change to the software product, such as to determine one or more potential causes for the change. For example, the specific type of change can correspond to a specific patch, virus, or malware that affected the files 20 of the computer system 12. As another example, the specific type of change can correspond to updates to the software product(s), such as to a more recent version. The trust repository 16 can be preprogrammed and updated with the software change patterns as they become available, such as based on Internet access to websites, as described in greater detail herein. For example, the software change storage 36 can implement the results of the matching algorithm 34 to compare the results with the predetermined software change patterns, such as based on one or more pattern recognition algorithms. Thus, the software change storage 36 can determine matching scores, similar to as described previously regarding the matching algorithm 34, that can be indicative of one or more potential causes of the changes to the indicated one or more software products.

Upon determining the results of the matching algorithm 34 and determining potential causes for the change in the software product(s), the trust repository 16 can transmit the results to the ETS 14, demonstrated in the example of FIG. 1 as a response RSLT. The response RSLT can correspond to a report (e.g., an XML file) that includes data identifying all of the potential software products, including associated matching scores, which are associated with the difference set of file signatures in the product ID request P_RQ. The ETS 14 includes a software report generator 38 that is configured to generate a software change report RPRT that is indicative of the results of the matching algorithm 34 and the potential causes potential causes for the change in the software product(s). The software change report RPRT can be transmitted to the computer system 12. For example, the software change report can be provided in a format that is able to be accessed and viewed by a user of the computer system 12, such as in a portable document format (PDF) format. As another example, the software-identification report RPRT can be saved at the ETS 14, such that the user can view the report via the user interface 22, such as accessible as a webpage on the network.

For example, the software change report RPRT can include each file that was included in the difference set of file signatures in the product ID request P_RQ (e.g., by file name), an install path for each file, a time stamp for the file, as well as its score value, and a product identifier for the corresponding software product that changed. The product identifier can be associated with additional details in the returned results, such as can include product-related parameters. The product-related parameters, for example, can include a product identifier (ID), a global unique identifier (GUID), product name, product vendor, a description or other metadata about the product, platform on which the product runs, vendor of the intended platform and/or other product attributes.

Figure 3:
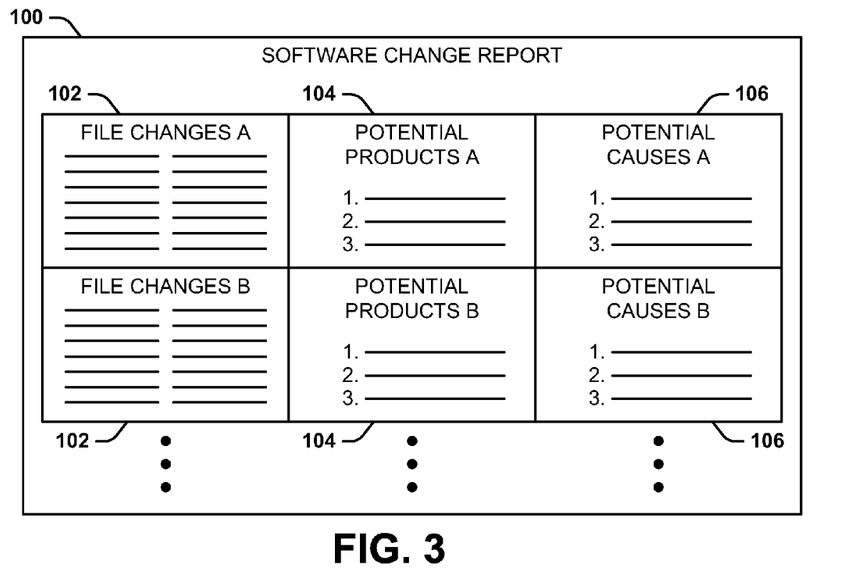
FIG. 3 illustrates an example of a software identification report in accordance with an aspect of the invention.

By way of additional context, FIG. 3 illustrates an example of a software change report 100 that can be generated (e.g., by the report generator 38 of the ETS 14). The software change report 100 can be provided in any of a variety of software file formats that can be accessed and/or viewed via the computer system 12, or by the a user of the ETS 14 though the user interface 22. The software change report 100 includes a plurality of lists of file changes 102, demonstrated in the example of FIG. 3 as FILE CHANGES A, FILE CHANGES B, etc., that can each include the files 20 that are associated with the difference set of file signatures in the product ID request P_RQ, and thus are indicative of the files that changed since the creation of the baseline set of file signatures. The lists of file changes 102 can be organized by the trust repository 16 or the ETS 14 based on a likelihood of association with a given set of software products, such that each file in a given list of file changes 102 can all be associated with the same software product or products. The list of file changes 102 can also be organized by whether the change is an addition, a removal, or a modification, such that the list of file changes 102 groups changes of a similar nature together.

The software change report 100 also can include multiple sets of potential software products 104, demonstrated in the example of FIG. 3 as POTENTIAL PRODUCTS A, POTENTIAL PRODUCTS B, POTENTIAL PRODUCTS C, etc. that can be associated with each of the respective lists of file changes 102. Each of the sets of potential products 104 can thus demonstrate a list of one or more of the software products with which the files 20 corresponding to the difference set of file signatures is associated, such as to identify the one or more software products that changed. In the case where the list of file changes 102 are organized by the type of change as described herein (e.g., by addition, removal or modification), the associated potential products 104 can be indicative of the products that were likely added, removed, or modified on the computer system 12. The potential products 104 can also include respective matching scores of each of the software products represented in the given set of potential products 104, such as in order of statistically computed likelihood of respective corresponding software product. The matching score can be represented as any of a variety of metrics, such as a raw score, an adjusted score, a percentage, and the like. Therefore, a given user of the computer system 12 or of the ETS 14 can be able to identify that the given list of file changes 102 are associated with the respective software products provided in the respective set of potential products 104. Additionally, if the software comparator 32 is unable to identify any software products with which the files 20 are likely to be associated, or if none of the matching scores generated by the matching algorithm 34 exceed a given threshold, then the respective set of potential products 104 can specify "no match", such as to indicate that the files 20 associated with the difference set of file signatures cannot be identified as belonging to any software products in the software reference storage 30.

In addition, the software change report 100 also includes sets of potential software change causes 106, demonstrated in the example of FIG. 3 as POTENTIAL CAUSES A, POTENTIAL CAUSES B, POTENTIAL CAUSES C, etc., that can be associated with each of the respective lists of file changes 102. The sets of potential software change causes 106 can be based on the results of the matching algorithm 34 corresponding to or being substantially closely associated with one or more software change patterns, such as saved in the software change storage 36. For example, the sets of potential causes 106 can also include respective matching scores of each of the potential causes, such as based on the results of a pattern recognition algorithm implemented by the software change storage 36 or associated processing component in the trust repository 16. The matching score can be represented as any of a variety of metrics, such as a raw score, an adjusted score, a percentage, etc. Therefore, a given user of the computer system 12 can be able to identify one or more potential causes corresponding to the given list of file changes 102, such as viruses, malware, software patches, or software updates. Furthermore, if the software change storage 36 is unable to identify any potential causes for the associated set of software changes 102, then the respective set of potential software change causes 106 can indicate "no known cause".

It is to be understood that the software change report 100 is not limited to the example of FIG. 3. For example, the software change report 100 can include any of a variety of additional information, such as timestamps, associated file systems 18 of the files 20, information associated with the file signatures 50 of the files 20 in the lists of file changes 102, or any of a variety of other information that may be necessary for troubleshooting or maintaining the computer system 12. In addition, while the lists of file changes 102, the sets of potential products 104, and the sets of potential software change causes 106 are demonstrated as including multiple items, it is to be understood that a given list of file changes 102 can include a single file 20, that a given set of potential products 104 can include a single software product, and that a given set of potential software change causes 106 can include a single software change cause. Therefore, the software change report 100 can be organized and configured in any of a variety of ways.

Figure 4:
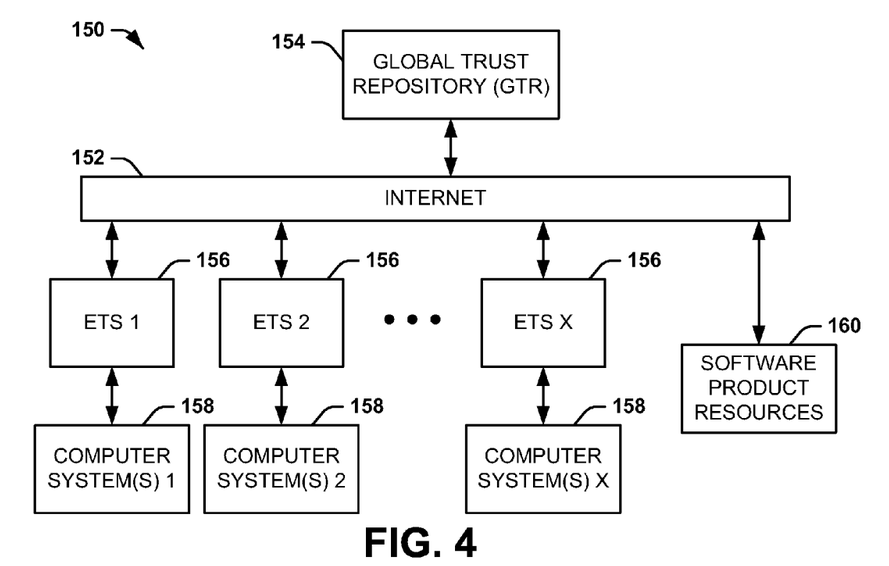
FIG. 4 illustrates an example of a network system in accordance with an aspect of the invention.

FIG. 4 illustrates an example of a system 150 that can be implemented in accordance with an aspect of the invention. The system 150 is demonstrated in the example of FIG. 4 includes a network 152, such as can include one or more of a LAN and/or WAN (e.g., the Internet). Thus, the system 150 can be configured as an Internet-based system. The system 150 includes a Global Trust Repository (GTR) 154 that can be configured substantially similar to the trust repository 16 in the example of FIG. 1. The GTR 154 is connected to a network 152 and is configured to store predetermined software file signature data associated with a very large number (e.g., billions) of files that correspond to a very large number (e.g., millions) of software products. As an example, the predetermined software file signature data can include predetermined cryptographic hash data associated with the respective files of the software products. The predetermined software file signature data can be stored in a software reference storage, similar to as described previously in the example of FIG. 1. Thus, the GTR 154 can be configured to service worldwide software change identification requests.

The network system 150 also includes one or more enterprise trust servers (ETSs) 156. Each ETS 156 can be implemented as a different computing device, or multiple ETSs 156 can be provided on a signal computing device. In the example of FIG. 4, there is demonstrated a plurality X of ETSs 156, where X is a positive integer, in which each ETS 156 is coupled to the network 152. As an example, each of the ETSs 156 can be associated with a private enterprise network, a local area network (LAN), or a geographical division of the service area of a network service provider. For instance each ETS 156 can be implemented by a different entity, such as can be a person, a business (e.g., corporation, partnership, company or the like), or a group or division of a company. Each of the ETSs 156 is communicatively coupled to one or more computer systems 158, which can include a large number of computer systems 158, via a network. As an example, each of the ETSs 156 can be communicatively coupled with respective computer system(s) 158 via a LAN, WAN, or other network, including the network 152.

Similar to as described previously with respect to the example of FIG. 1, a given ETS 156 can initiate (e.g., automatically or in response to a user input) a software change identification request that is provided to a respective ETS client that can be resident on one or more of the respective computer systems 158 that is serviced by the given ETS 156. The respective ETS client can scan the files delineated in the software change identification request from file systems of the one or more of the computer(s) 158 and can generate file signatures associated with each of the files. The file signatures can include, for example, cryptographic hash data associated with the file content of the respective files. The set of file signatures can be transmitted to the respective ETS 156 as a client request. The respective ETS 156 can compare the file signatures with a baseline set of file signatures, such as created at a last scan of the files of the respective computer(s) 158. As an example, the respective ETS 156 can store a baseline set of file signatures for each respective one of the computer(s) 158, or can include a single baseline set of file signatures for more than one of the respective computer(s) 158. The ETS 156 can generate a difference set of file signatures as a result of this comparison.

The difference set of file signatures can be transmitted via the network 152 to the GTR 154 as a product ID request. Similar to as described previously in the example of FIG. 1, the GTR 154 can include a software comparator that is configured to implement a matching algorithm to compare the difference set of file signatures (e.g., the cryptographic hash data) with the predetermined software file signature data for identification of software products associated with the difference set of file signatures to identify which software products changed for the given one or more of the computer systems 158. The GTR 154 can also determine one or more potential causes for the change to the one or more computer systems 158, such as based on implementation of a pattern recognition algorithm relative to predetermined software change patterns. The GTR 154 can transmit the results of the comparison and the potential causes back to the respective ETS 156, which can generate a software change report that can be provided to the respective one or more computer(s) 158 or can be accessible from the respective ETS 156, similar to as described previously in the examples of FIGS. 1 and 3.

The network system 150 further includes software product resources 160. As an example, the software product resources 160 can include a plurality of software products that are located on various websites on the network 152. As an example, the GTR 154 can include automated and manual harvesting methods that monitor the respective vendor websites and software download portals for major commercial software vendors and download new software products when they are released. As another example, the software product resources 160 can also be accessed via portals to specific commercial vendors that provide secure connections to the GTR 154, such as for uploading software products and corresponding software files to the GTR 154, such as in response to requests or financial transactions. The downloaded software products can be deconstructed by a front end system of the GTR 154, or by the GTR 154 itself, and all of the contained files can be scanned to create predetermined software file signature data, such as including the predetermined cryptographic hash data of the file content (see, e.g., FIG. 2 and its corresponding description herein). The created predetermined file signatures can be packaged together with information (e.g., metadata) on the specific software product with which they are associated and can be stored as the predetermined software file signature data, including the predetermined cryptographic hash data, in an associated database (e.g., a software reference storage). The GTR 154 can also use the software product resources 160 to download and/or determine software change patterns, such as can be implemented for determining the potential causes for software product changes, such as described previously. In addition, the GTR 154 can be configured to, in response to being unable to identify a given software product based on the difference set of file signatures, store the file signature in the associated database, such as for future identification based on subsequent website harvesting or for matching with other similar file signatures for determining file associations.

Figure 5:
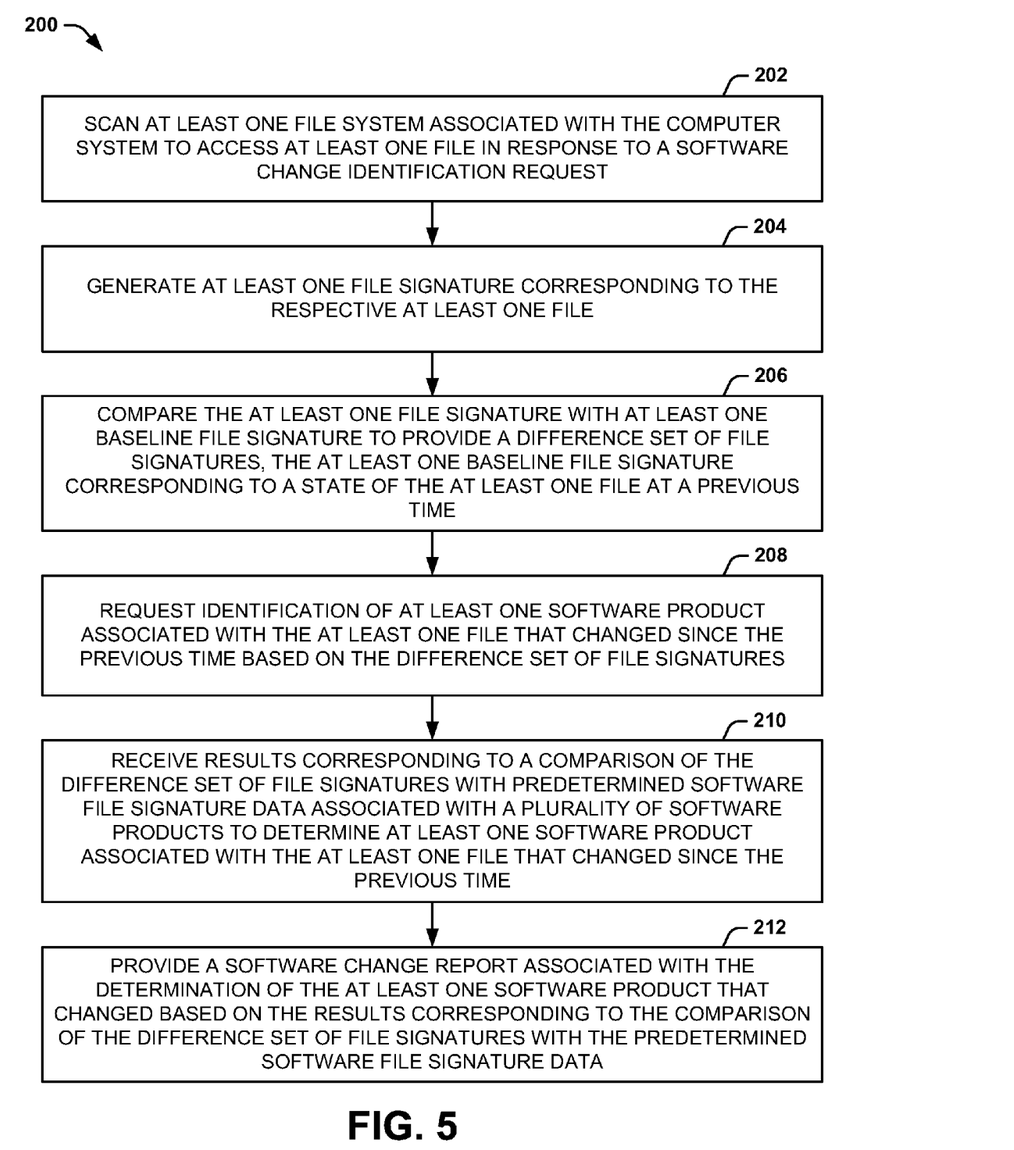
FIG. 5 illustrates an example of a method for identifying a change in software on a computer system in accordance with an aspect of the invention.

In view of the foregoing structural and functional features described above, an example method will be better appreciated with reference to FIG. 5. While, for purposes of simplicity of explanation, the method of FIG. 5 is shown and described as executing serially, it is to be understood and appreciated that the method is not limited by the illustrated order, as some aspects could, in other embodiments, occur in different orders and/or concurrently with other aspects from that shown and described herein. Moreover, not all illustrated features may be required to implement a method.

FIG. 5 illustrates an example of a method 200 for identifying a change in software on a computer system in accordance with an aspect of the invention. At 202, at least one file system associated with the computer system is scanned to access at least one file in response to a software change identification request. The software change identification request can include a list of files on respective one or more file systems for which a determination of a software product change is requested. The software change identification request can be initiated by a user of the computer system or an ETS, such as via a software program, or can be initiated automatically and/or periodically by the computer system or the ETS. The scanning can be performed by an ETS client on the computer system or can be based on downloading the files or accessing the files via a network to the ETS.

At 204, at least one file signature corresponding to the respective at least one file is generated. The file signatures can include characteristics of the respective file, such as file name, file system path, file attributes, file permissions, and/or cryptographic hash data associated with file content. At 206, the at least one file signature are compared to at least one baseline file signature to generate a difference set of file signatures, the at least one baseline file signature corresponding to a state of the at least one file at a previous time. Thus, the file signatures can be saved as the baseline set of file signatures for a comparison at a future time. At 208, identification of at least one software product associated with the at least one file that changed since the previous time is requested based on the difference set of file signatures. The identification request can be provided to the trust server.

At 210, results corresponding to a comparison of the difference set of file signatures with predetermined software file signature data associated with a plurality of software products are received to determine at least one software product associated with the at least one file that changed since the previous time. The comparison can be a comparison of cryptographic hash data with predetermined cryptographic hash data associated with the predetermined software file signature data. The comparison can be performed by a matching algorithm implemented at a trust repository that stores predetermined software file signature data that includes the predetermined cryptographic hash data. The trust repository can be a GTR coupled to the Internet that services worldwide software change identification requests. At 212, a software change report associated with the determination of the at least one software product that changed based on the results correspond the comparison of the difference set of file signatures with the predetermined software file signature data is provided. The software change report can include a list of likely software products that changed, such as including a metric that indicates the likelihood. The software change report can also include a list of potential causes of the change to the respective software product(s), such as based on a pattern recognition algorithm relative to predetermined software change patterns.

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An enterprise trust server comprising a processor and memory and programmed to execute machine readable instructions that, when executed, cause the enterprise server to:
   - initiate generation of a first at least one file signature associated with a first at least one file accessed from at least one file system associated with a computer system at a first time, and generation of a second at least one file signature associated with a second at least one file accessed from the at least one file system at a second time subsequent to the first time; and
   - compare the first and second at least one file signature to determine a difference set of file signatures;
   - send a request comprising the difference set of file signatures to a trust repository; and
   - receive a response that identifies at least one software product associated with the first and second at least one file that changed between the first and second times based on the difference set of file signatures.

2. The enterprise trust server of claim 1, wherein the difference set of file signatures comprises at least one file signature in the first at least one file signature that is not in the second at least one file signature, at least one file signature in the second at least one file signature that is not in the first at least one file signature, at least one file signature in each of the first and second at least one file signature having at least one common characteristic and at least one difference in file content, or an indication of no difference between the first and second at least one file signature.

3. The enterprise trust server of claim 1, wherein the first and second at least one file signature each comprises cryptographic hash data associated with at least a portion of file content of the respective first and second at least one file based on a non-reversible data encoding algorithm that identifies the at least a portion of the file content of the respective first and second at least one file, the trust repository being configured to compare the cryptographic hash data of the difference set of file signatures with predetermined cryptographic hash data associated with a plurality of software products to determine the at least one software product associated with the first and second at least one file that changed between the first and second times.

4. The enterprise trust server of claim 1, wherein the enterprise trust server is further configured to receive from the trust repository response data associated with a result of the comparison, and wherein the enterprise trust server further comprises a software report generator configured to generate a software change report comprising a list of potential software products associated with the computer system that changed between the first and second times.

5. The enterprise trust server of claim 1, wherein the response is generated at the trust repository via a software comparator configured to implement a matching algorithm on the difference set of file signatures with respect to predetermined file signature data to generate matching scores corresponding to likelihoods that respective software products correspond to the at least one software product, the matching scores being provided to the computer system as a software change report via the enterprise trust server.

6. The enterprise trust server of claim 1, wherein the enterprise trust server is configured to initiate generation of the first and second at least one file signatures in response to at least one scan request that is provided to an enterprise trust server client via the user interface, the enterprise trust server client being configured to scan the at least one file system to generate the first and second at least one file signatures at the respective first and second times.

7. The enterprise trust server of claim 1, wherein the response comprises at least one potential cause for a respective change associated with the first and second at least one file between the first and second times based on the trust repository invoking a software change storage configured to store patterns associated with changes in difference sets of file signatures.

8. The enterprise trust server of claim 1, wherein the enterprise trust server is configured to store the first at least one file signature at approximately the first time as a baseline set of file signatures for comparison with the second at least one file signature at the second time to generate the difference set of file signatures, and wherein the second at least one file signature is saved at the enterprise trust server at approximately the second time as the baseline set of file signatures for comparison with a third at least one file signature generated at a third time to generate the difference set of file signatures, the third at least one file signature being associated with a third at least one file accessed from the at least one file system at the third time.

9. The enterprise trust server of claim 8, wherein the third at least one file accessed from the at least one file system at the third time is associated with a user specified at least one software product in response to a determination that the difference set of file signatures at the second time is associated with the user specified at least one software product.

10. A network system comprising the enterprise trust server of claim 1, wherein the enterprise trust server is one of a plurality of enterprise trust servers, the trust repository being configured as a global trust repository coupled to the plurality of enterprise trust servers via a network, and wherein the global trust repository is configured to periodically access software resources from a plurality of resource locations on the network to generate predetermined software file signature data.

11. A non-transitory computer-readable medium programmed for performing a method for identifying a change in software on a computer system, the method comprising:
   scanning at least one file system associated with the computer system to access at least one file in response to a software change identification request;
   generating at least one file signature corresponding to the respective at least one file;
   comparing the at least one file signature to at least one baseline file signature to provide a difference set of file signatures, the at least one baseline file signature corresponding to a state of the at least one file at a previous time;
   requesting identification of at least one software product associated with the at least one file that changed since the previous time based on the difference set of file signatures;
   receiving results corresponding to a comparison of the difference set of file signatures with predetermined file signature data associated with a plurality of software products to determine the at least one software product; and
   providing a software change report associated with the determination of the at least one software product that changed based on the results corresponding to the comparison of the difference set of file signatures with the predetermined file signature data.

12. The medium of claim 11, wherein the difference set of file signatures comprises at least one file signature in the at least one baseline file signature that is not in the generated at least one file signature, at least one file signature in the generated at least one file signature that is not in the at least one baseline file signature, at least one file signature in each of the baseline and generated at least one file signature having at least one common characteristic and at least one difference in file content, or an indication of no difference between the baseline and generated at least one file signature.

13. The medium of claim 12, wherein providing the software change report comprises identifying the at least one software product associated with the at least one file signature in the at least one baseline file signature that is not in the generated at least one file signature, with the at least one file signature in the generated at least one file signature that is not in the at least one baseline file signature, or with the at least one file signature in each of the baseline and generated at least one file signature having at least one common characteristic and at least one difference in file content.

14. The medium of claim 11, wherein generating the at least one file signature comprises generating cryptographic hash data associated with at least a portion of file content of the at least one file based on a non-reversible data encoding algorithm that identifies the at least one file, wherein comparing the difference set of file signatures comprises comparing the cryptographic hash data of the difference set of file signatures with predetermined cryptographic hash data associated with the plurality of software products to determine the at least one software product that changed since the previous time.

15. The medium of claim 11, wherein the results are derived according to a matching algorithm of the difference set of file signatures with respect to the predetermined file signature data to generate matching scores corresponding to likelihoods that respective software products correspond to the at least one software product, and wherein providing the software change report comprises providing the software change report comprising a list of a plurality of potential software products corresponding to the at least one software product and the matching scores associated with the respective plurality of potential software products.

16. The medium of claim 11, wherein the difference set of file signatures is a first difference set of file signatures and wherein the software change report is a first software change report, the method further comprising:
   storing the at least one file signature as the at least one baseline file signature at a first time;
   initiating a second software change identification request at a second time subsequent to the first time;
   scanning the at least one file system associated with the computer system to access a second at least one file in response to the second software change identification request;
   generating a second at least one file signature corresponding to the respective second at least one file;
   comparing the second at least one file signature to the at least one baseline file signature to generate a second difference set of file signatures;

receiving results corresponding to a comparison of the second difference set of file signatures with the predetermined file signature data to determine the at least one software product associated with the second at least one file that changed since the first time; and providing a second software change report associated with the determination of the at least one software product that changed based on the results corresponding to the comparison of the second difference set of file signatures with the predetermined file signature data.

17. The medium of claim 11, wherein the results further comprise a determination of at least one potential cause for the determined change in the at least one software product based on a comparison of characteristics of the determined change in the at least one software product with predetermined software change pattern data.

18. A network system comprising:

a plurality of enterprise trust servers comprising a processor and memory and programmed with machine readable instructions that when executed cause the enterprise servers to initiate generation of a first plurality of file signatures associated with a first plurality of files accessed from at least one file system associated with at least one computer system at a first time, and generation of a second plurality of file signatures associated with a second plurality of files accessed from the at least one file system at a second time subsequent to the first time, the plurality of enterprise trust servers each being further configured to compare the respective first and second pluralities of file signatures to determine a difference set of file signatures; and a computer comprising a process that is programmed to receive the difference set of file signatures in a respective request from each of the plurality of enterprise trust servers, the trust repository being configured to compare the difference set of file signatures with predetermined file signature data associated with a plurality of software products to determine at least one software product associated with the first and second pluralities of files that changed between the first and second times, and to provide results associated with the comparison back to the respective plurality of enterprise trust servers.

19. The system of claim 18, wherein the first and second pluralities of file signatures comprise cryptographic hash data associated with file content of the respective first and second pluralities of files based on a non-reversible data encoding algorithm that identifies the respective first and second pluralities of files, the trust repository being configured to compare the cryptographic hash data of the difference set of file signatures with predetermined cryptographic hash data associated with the plurality of software products to determine the at least one software product associated with the first and second pluralities of files that changed between the first and second times.

20. The system of claim 18, wherein the trust repository comprises a software change storage configured to store patterns associated with changes in difference sets of file signatures, the trust repository being further configured to identify at least one potential cause for a respective change associated with the first and second pluralities of files between the first and second times.

21. The system of claim 18, wherein the trust repository is configured to periodically access software resources from a plurality of web sites on the network to generate the predetermined file signature data.

* * * * *